United States Patent [19]

Fontanella et al.

[11] 3,886,177

[45] May 27, 1975

[54] PYRROLO(1,2-C)IMIDAZOLE-3-ONE DERIVATIVES

[75] Inventors: Luigi Fontanella, Milan; Emilio Occelli, Parabiago, both of Italy

[73] Assignee: Gruppo Lepetit S.p.A., Milan, Italy

[22] Filed: Oct. 26, 1973

[21] Appl. No.: 409,984

[30] Foreign Application Priority Data

Nov. 3, 1972    Italy................................. 31273/72

[52] U.S. Cl......... 260/309.7; 260/247.2; 260/268 C; 260/293.69; 260/326.85; 424/273
[51] Int. Cl.².......................................... C07D 49/34
[58] Field of Search................................. 260/309.7

[56] References Cited
FOREIGN PATENTS OR APPLICATIONS
46-16990   11/1971   Japan............................... 260/309.7

*Primary Examiner*—Lewis Gotts
*Assistant Examiner*—Ethel G. Love
*Attorney, Agent, or Firm*—Theodore Post; C. Kenneth Bjork

[57]  ABSTRACT

Pyrrolo[1,2-c]imidazole derivatives of the formula

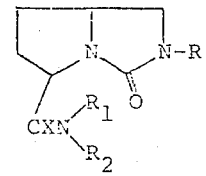

wherein R is a phenyl radical, $R_1$ and $R_2$ are independently selected from hydrogen, lower alkyl, a phenyl and a benzyl radical, and $NR_1R_2$ is a heterocyclic radical selected from pyrrolidino, morpholino, piperazino and piperidino having up to two lower alkyl substituents, and X represents $H_2$ or oxygen. The compounds have central nervous system activity.

6 Claims, No Drawings

PYRROLO(1,2-C)IMIDAZOLE-3-ONE DERIVATIVES

Summary of the Invention

This invention is concerned with new pyrrolo[1,2-c]imidazole derivatives of the general formula

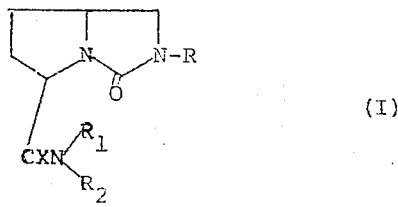

substituents, wherein R is a phenyl radical, $R_1$ and $R_2$ are independently selected from the class consisting of hydrogen, lower alkyl, a phenyl, and a benzyl radical and wherein $NR_1R_2$ is a heteroclic radical selected from pyrrolidino, morpholino, piperazino and piperidino having up to two lower alkyl sustituents, and X represents $H_2$ group or oxygen. The terms "a phenyl" and "a benzyl" refer to phenyl and benzyl, respectively, which may bear on the aromatic ring substitution selected from halo and lower alkoxy radicals; "lower alkyl" and "lower alkoxy" refer to alkyl and alkoxy having from 1 to 4 carbon atoms; and "halo" refers to chloro or bromo. Preferred compounds are the ones wherein $R_1$ and $R_2$ are independently ethyl and benzyl or both are ethyl, and R is phenyl. A further preferred group of compounds comprises the ones wherein R is phenyl and $R_1$ and $R_2$ are independently selected from hydrogen, ethyl and benzyl.

Description of the Preferred Embodiments

The compounds of the present invention are prepared by cyclizing a compound of the formula

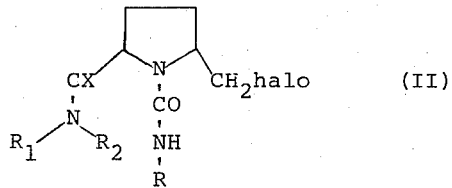

wherein X, R, $R_1$, $R_2$ and halo have the meanings previously given, by heating the compound in the presence of a large molar excess of a base selected from amides, carbonates, hydrides or hydroxides of metals of Groups I and II of the periodic table, in the presence of an organic solvent such as, for example, acetone, benzene, ether, lower halogenated hydrocarbons, dimethylformamide and the like. The temperature of reaction varies from about 5°C. to about the boiling temperature of the reaction mixture, and cyclization is generally completed within about 1 to about 11 hours. Best results are obtained using a carbonate or a hydride of an alkali metal, e.g., of sodium or potassium, as the base and anhydrous benzene, anhydrous acetone or dimethylformamide as the solvent and refluxing the reaction mixture for about 2 to about 8 hours. The compounds are then recovered following usual techniques of preparative organic chemistry. For example, the reaction mixture may be filtered to remove impurities which form during the reaction and the solvent is evaporated under reduced pressure. The residue so obtained can in turn be freed from any undesirable byproduct by column chromatography. A further purification may be carried out by crystallization if the compound is a solid or by fractional distillation if the resulting product is a liquid or an oily distillable substance.

The starting compounds of formula (II) are prepared from an intermediate of the formula

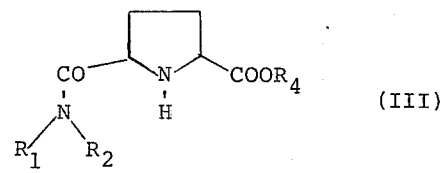

wherein $R_1$ and $R_2$ have the meanings given above and $R_4$ is a lower alkyl radical. This product, prepared following the method described by Cignarella and Testa in Gazz. Chim. Ital. 92, 1093, 1962, is then treated with one of the reducing metal hydrides and mixed metal hydrides selected from aluminum hydride, lithium and aluminum hydrides, sodium and boron hydrides, and lithium and boron hydrides. More particularly, when it is desired to have a compound of formula (II) wherein X is oxygen, the reduction is advantageously carried out with sodium borohydride in an anhydrous organic solvent selected from 1 to 4 carbon atom alkanols, dimethylformamide, tetrahydrofuran and the like at a temperature varying from about minus 10°C. to room temperature. A compound of the formula

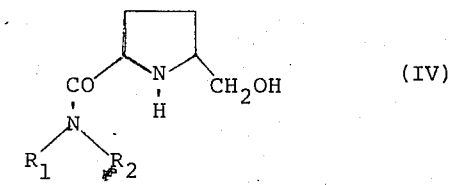

wherein $R_1$ and $R_2$ have the meanings given above, is so obtained which, according to well known procedures, by treatment with a thionyl or phosphorus halide and further reaction with an equimolecular amount of an isocyanate of the general formula R—N=C=O, wherein R has the meaning given above, affords the desired compound of formula (II) wherein X is an oxygen atom.

Alternatively, when a compound of formula (II) wherein X is $H_2$ is desired, the reduction of compound (III) is carried out with an excess of greater than two equimolecular amounts of lithium and aluminum hydride in the presence of an inert anhydrous organic solvent, such as, for instance, diethyl ether dioxane, tetrahydrofuran, at a temperature varying from about 10°C. to room temperature. A compound of the formula

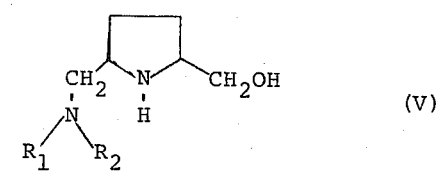

wherein $R_1$ and $R_2$ have the above given meanings is thereby obtained, which, according to well-known procedures, by treatment with a thionyl or phosphorus halide and further reaction with an equimolecular amount of an isocyanate of the formula R—N=C=O, wherein R has the same meaning as given before, affords the desired compound of formula (II) wherein X is $H_2$.

The compound of formula (III), prepared as described by Cignarella and Testa in Gazz. Chim. Ital. 92, 1093, 1962 generally is a mixture of the two possible cis- and trans-isomers which, if desired, can be separated and characterized. Therefore the starting compound of formula (II) may consist of an isomeric form which, upon cyclization, will give a product of formula (I), which will hereinafter be named the α-isomer if it is the product resulting from the cyclization of a compound of formula (II) the structure of which is trans-, or the β-isomer if it is the product resulting from the cyclization of a compound of formula (II) the structure of which is cis. However, the compounds of formula (III) are preferably used as a mixture of the two isomers for the further cyclization step. In this case, the final compounds of formula (I) which result from the cyclization of a product which is a mixture of the two isomers, will be a mixture of the two α- and β-isomers which optionally may be separated by known techniques, such as, for example, by column chromatography. Due to the presence of two asymmetry centers at positions 5 and 8, the compounds of formula (I) can theoretically be a mixture of four optical isomers. It is therefore obvious that the final products may be separated into the possible pairs of enantiomers, which, in turn, are resolvable into the corresponding pure optically active forms (enantiomers).

Although the selection of the solvent and of the base in the cyclization step is not critical, since the usual organic media and the most commonly employed alkali metal and alkaline earth metal bases advantageously can be used, it was surprisingly found that, depending on the solvent and on the cyclizing alkaline agent, it is sometimes possible to obtain the final compounds of formula (I) as the α- or β-isomer, even if the starting material is a mixture of the cis- and trans-forms of the compound of formula (II). Thus, for example, if the cyclization of a mixture of cis- and trans-forms of 2-chloromethyl-5-ethylcarbamyl-1-phenylcarbamyl-pyrrolidine is carried out by using sodium hydride as the base and anhydrous benzene as the solvent, only the α-isomer of 5-ethylcarbamyl-2-phenylhexahydro-1H-pyrrolo[1,2-c]imidazole-3-one is obtained; but if the cyclization reaction is carried out using potassium carbonate as the base and anhydrous acetone as the solvent, only the β-isomer of 5-ethycarbamyl-2-phenylhexahydro-1H-pyrrolo[1,2-c]imidazole-3-one is obtained. Moreover, it is possible to change one isomeric form into another by treating it with a suitable basic agent such as, for example, a liquid ammonia solution of a metal of group I or II of the periodic table of elements.

The following additional description and examples further describe the invention and the manner and process of making and using it to enable the art skilled to make and use the same and set forth the best mode contemplated by the inventors of carrying out the invention.

Example 1

5-Ethylcarbamyl-2-phenyl-hexahydro-1H-pyrrolo[1,2-c]imidazole-3-one (β-isomer)

A suspension of 1 gram (0.00725 mole) of finely subdivided potassium carbonate in 50 ml. of anhydrous acetone and 1 gram (0.00323 mole) of 2-chloromethyl-5-ethyl-carbamyl-1-(phenylcarbamyl)pyrrolidine is refluxed for 7½ hours. The reaction mixture is allowed to stand for 2 days then solvent is evaporated under vacuum. A solid residue is obtained which is triturated with water, filtered and dried. After crystallization from benzene, 0.56 g. of the titular compound is obtained, m.p. 188°–191°C.

Example 1

5-Ethylcarbamyl-2-phenyl-hexahydro-1H-pyrrolo[1,2-c]imidazole-3-one (α-isomer)

An oily suspension of 0.200 g. (0.00832 mole) of sodium hydride is poured into a flask containing 10 ml. of anhydrous benzene. Then a solution of 1 g. (0.00323 mole) of 2-chloromethyl-5-ethylcarbamyl-1-(phenylcarbamyl)pyrrolidine in 40 ml. of anhydrous benzene is added at room temperature. The mixture is refluxed for two and a half hours, then it is cooled, washed with water, dried and evaporated to dryness. The residue obtained is triturated with diethyl ether, then the ether is evaporated. The recovered solid is recrystallized from benzene to yield 0.57 g. of the titular compound, m.p. 98°–100°C.

Examples 3–4

5-Diethylcarbamyl-2-phenyl-hexahydro-1H-pyrrolo[1,2-c]imidazole-3-one (α-isomer) and
5-Diethylcarbamyl-2-phenyl-hexahydro-1H-pyrrolo[1,2-c]imidazole-3-one (β-isomer)

1.1 Gram (0.0458 mole) of an oil suspension of sodium hydride is poured into a flask containing 100 ml. of freshly distilled dimethylformamide. Then a dimethylformamide solution of 5.5 g. (0.0163 mole) of 2-chloromethyl-5-diethylcarbamyl-1-(phenylcarbamyl)-pyrrolidine is added and the resulting mixture is stirred for 5 hours at 70°C. and for 1½ hours at 105°C. The solution is then cooled to room temperature and filtered to remove impurities, the solvent is evaporated, the residue obtained is dissolved in benzene and the resulting solution is again brought to dryness by evaporating the benzene. A quantity of 6.2 g. of a solid compound is obtained which is passed through a silica-gel column, using as the eluent benzene containing increasing amounts of from 5 to 20% ethyl acetate. From fractions 12 to 28, a product is recovered which is recrystallized from diethyl ether: yield 2.93 g., m.p. 114°C. This compound is identified as the α-isomer of the titular product.

From fractions 29 to 33, a compound is obtained which is recrystallized from diethyl ether to yield 0.280 g., m.p. 158°C. This compound is identified as the β-isomer of the titular product.

Example 5

5-Benzylcarbamyl-2-phenyl-hexahydro-1H-pyrrolo[1,2-c]imidazole-3-one (β-isomer)

Following substantially the procedure of Example 1, starting from 5-benzylcarbamyl-2-chloromethyl-1-(phenylcarbamyl)pyrrolidine, the titular compound is prepared, yield 95.8%, m.p. 213°–215°C. (from benzene).

Example 6

5-Benzylcarbamyl-2-phenyl-hexahydro-1H-pyrrolo[1,2-c]imidazole-3-one (α-isomer)

To a solution prepared from 0.250 g. of metallic sodium and 30 ml. of liquid ammonia, 2.92 g. (0.0087 mole) of the compound of Example 5 is added. The ammonia is allowed to evaporate, 30 ml. of benzene is added and the resulting mixture is refluxed for 2 hours. It is cooled to 0°C. and 8 ml. of distilled water is added thereto. The impurities are filtered off and the benzene layer is separated from the aqueous layer which is then extracted with benzene. The two benzene solutions are collected and dried over sodium sulphate. The solvent is evaporated under vacuum and the solid obtained is recrystallized from benzene to give 1.18 g. of the titular compound, m.p. 138°–140°C.

Example 7

5-Ethylbenzylcarbamyl-2-phenyl-hexahydro-1H-pyrrolo[1,2-c]imidazole-3-one (α- and β-isomers)

This compound is prepared pursuant to the procedure of Example 1, starting from 2-chloromethyl-5-ethylbenzyl-carbamyl-1-(phenylcarbamyl)pyrrolidine, yield 75.7%, m.p. 132°–133°C. (from benzene).

Example 8

2-(m-Chlorophenyl)-5-dimethylaminomethyl-hexahydro-1H-pyrrolo[1,2-c]imidazole-3-one hydrochloride (α- and β-isomers)

Pursuant to the procedure of Example 1 and starting from 2-chloromethyl-1-(m-chlorophenylcarbamyl)-5-(dimethylaminomethyl)pyrrolidine, the titular compound is obtained, which is isolated as the hydrochloride by additon fo hydrogen chloride to diethyl ether solution thereof, yield 49%, m.p. 217°C. (from benzene/dichloromethane).

Example 9

2-(m-Chlorophenyl)-5-pyrrolidinomethyl-hexahydro-1H-pyrrolo[1,2-c]imidazole-3-one (α- and β-isomers)

The compound is prepared pursuant to the procedure described in Example 1, starting from the corresponding 2-chloromethyl-1-(m-chlorophenylcarbamyl)-5-(pyrrolidinomethyl)pyrrolidine, yield 48.6% m.p. 114°–116°C. (from methanol).

Example 10

5-Dimethylaminomethyl-2-(p-methoxyphenyl)-hexahydro-1H-pyrrolo[1,2-c]imidazole-3-one (α- and β-isomers)

Starting from the corresponding 2-chloromethyl-5-dimethylaminomethyl-1-(p-methoxyphenylcarbamyl)-pyrrolidine and following substantially the method of Example 1, the title compound is obtained, yield 46.4% m.p. 165°–168°C. (from light petroleum).

Example 11

5-Benzylcarbamyl-2-chloromethyl-1-(phenylcarbamyl)pyrrolidine (cis and trans)

a. To a suspension of 93.60 g. of $CaCl_2$ in 1400 ml. of absolute ethanol, a solution in 1470 ml. of absolute ethanol of 147 g. of 2-carbethoxy-5-(benzylcarbamyl)-pyrrolidine (prepared as described by Cignarella and Testa in Gazz. Chim. Ital. 92, 1093, 1962) is added. The resulting solution is cooled to minus 10°C., and 64.8 g. of sodium borohydride is added thereto portionwise. The resulting mixture is stirred for 20 minutes at minus 10°C., the temperature is then allowed to rise to room temperature and the reaction mixture is allowed to stand for three and a half hours. Aqueous 10% hydrochloric acid is added thereto to a pH of 2 to 3, the byproduct inorganic salts are filtered, and the filtrate is concentrated under vacuum. The residue is extracted with chloroform and after evaporation of the chloroform, 84.7 g. of 5-benzylcarbamyl-2-hydroxymethyl-pyrrolidine (cis and trans) is obtained.

b. To a solution in 100 ml. of chloroform of 36 g. of the product prepared under (a), an ether solution of hydrochloric acid is added to a pH of 2 to 3. The solvent is evaporated under vacuum and the residue is taken up with 440 ml. of chloroform. The resulting solution is cooled to 0°C. and 66 ml. of thionyl chloride is added with stirring. Stirring is continued for 10 minutes at 0°C., then the solution is refluxed for an hour. After cooling and evaporation of the solvent, 53.0 g. of crude 5-benzylcarbamyl-2-chloromethyl-pyrrolidine (cis and trans) is obtained, which is used as such for the further step.

c. 53.0 Grams of the crude product prepared under (b) is treated with water and diethyl ether. The two layers are separated and the aqueous solution is alkalized and extracted with methylene chloride. The two organic layers are recovered, dried over sodium sulphate, and the solvents are evaporated under vacuum. 30.3 Grams of a residue are obtained, which is taken up with 500 ml. of methylene chloride, and 14.3 ml. of phenyl isocyanate is added thereto. The mixture is refluxed for 20 minutes and the residue is recrystallized from benzene to yield 12.37 g. of the titular compound (cis and trans).

Pursuant to the procedure of Example 11, the following compounds of formula (II) wherein X is oxygen are prepared:

- 2-Chloromethyl-5-ethylcarbamyl-1-(phenylcarbamyl)pyrrolidine (cis and trans)
- 2-Chloromethyl-5-diethylcarbamyl-1-(phenylcarbamyl)pyrrolidine (cis and trans)
- 2-Chloromethyl-5-ethylbeznylcarbamyl-1-(phenylcarbamyl)-pyrrolidine (cis and trans).

The above compounds were used in the crude state for the subsequent cyclizaton step.

Following the procedure of Example 11, but using in the first step as the reducing agent an excess of more than two molecular proportions of lithium and aluminum hydride instead of sodium borohydride, the following compounds of formula (II) where X is $H_2$ are prepared:

- 2-Chloromethyl-1-(m-chlorophenylcarbamyl)-5-(dimethylaminomethyl)pyrrolidine (cis and trans)
- 2-Chloromethyl-1-(m-chlorophenylcarbamyl)-5-(pyrrolidinomethyl)pyrrolidine (cis and trans)
- 2-Chloromethyl-5-dimethylaminomethyl-1-(p-methoxyphenylcarbamyl)pyrrolidine (cis and trans).

The preceding compounds were also used in the crude state for the subsequent cyclization step.

The compounds of the present invention have central nervous system (C.N.S.) activity. Such activity was evaluated by investigating the behavior of mice and rats after administering an effective dose of the compounds, which proved particularly effective as sedatives and tranquillizers. A decrease of the spontaneous activity in mice was taken as a measure of the sedative effect, while the anxiety relieving effect was evaluated on the basis of the secondary avoidance response test. In experiments with representative compounds, amounts varying from 20 to 60 mg/kg i.p. of the compounds of Examples 3, 5, 6 and 7 were found to be effective on the above mentioned parameters. These favorable pharmacological properties are coupled with a generally very low toxicity, since the $LD_{50}$ values are always higher than 800 mg/kg i.p. in mice.

What is claimed is:

1. A hexahydropyrrolo[1,2-c]imidazole derivative of the formula

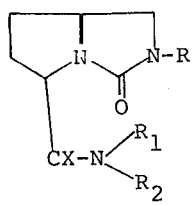

wherein R is a phenyl radical, $R_1$ and $R_2$ are independently selected from hydrogen, a lower alkyl, a phenyl and a benzyl radical, and wherein $NR_1R_2$ is a heterocyclic radical selected from pyrrolidino, morpholino, piperazino and piperidino having 0 to 2 lower alkyl substituent radicals and X represents $H_2$ or oxygen.

2. A compound of claim 1 where $R_1$ and $R_2$ are independently selected from hydrogen, ethyl and benzyl, R is phenyl and X is oxygen.

3. A compound of claim 1 wherein $R_1$ is ethyl and $R_2$ is benzyl, R is phenyl and X is oxygen.

4. A compound of claim 1, wherein $R_1$ and $R_2$ are ethyl, R is phenyl and X is oxygen.

5. A compound of claim 1, wherein $R_1$ is H, $R_2$ is benzyl, R is phenyl and X is oxygen.

6. A process for preparing a hexahydropyrrolo[1,2-c]imidazole derivative of the formula

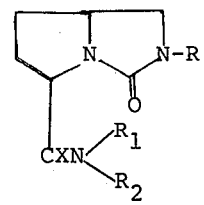

which comprises cyclizing a compound of the formula

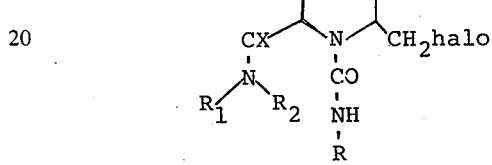

wherein X is $H_2$ or O, R is a phenyl radical, $R_1$ and $R_2$ are independently selected from hydrogen, a lower alkyl, a phenyl and benzyl radical, and wherein $NR_1R_2$ is a heterocyclic radical selected from pyrrolidino, morpholino, piperazino and piperidino having 0 to 2 lower alkyl substituent radicals and halo is chloro or bromo, by heating the latter in the presence of a large molar excess of a base selected from amides, carbonates, hydroxides and hydrides of metals of Group I and of the alkaline earth metals of the periodic table in an organic solvent at a temperature between about 5°C. and reflux temperature and recovering as product the pyrrolo[1,2-c]imidazole derivative.

* * * * *